United States Patent

Fischer

[11] Patent Number: 5,936,161
[45] Date of Patent: Aug. 10, 1999

[54] ARRANGEMENT FOR MAKING CONTACTLESS DISTANCE MEASUREMENTS

[75] Inventor: Norbert Fischer, Sehnde, Germany

[73] Assignee: ContiTech Luftfedersysteme GmbH, Hannover, Germany

[21] Appl. No.: 08/976,426

[22] Filed: Nov. 21, 1997

[30] Foreign Application Priority Data

Nov. 21, 1996 [DE] Germany .......................... 196 48 112

[51] Int. Cl.$^6$ ................................................. G01N 29/00
[52] U.S. Cl. ................................. 73/632; 73/801; 73/618
[58] Field of Search .............................. 73/584, 596, 597, 73/801, 618, 620, 627, 632; 361/99

[56] References Cited

U.S. PATENT DOCUMENTS

| | | | |
|---|---|---|---|
| 4,490,716 | 12/1984 | Tsuda et al. ............................ | 340/904 |
| 4,798,369 | 1/1989 | Geno et al. . | |
| 4,918,672 | 4/1990 | Iwabuchi et al. ......................... | 367/99 |
| 5,052,227 | 10/1991 | Le Floc'H et al. ....................... | 73/597 |
| 5,163,323 | 11/1992 | Davidson ................................. | 73/597 |
| 5,418,758 | 5/1995 | Webster ................................. | 367/101 |
| 5,642,869 | 7/1997 | Miller ................................. | 246/182 B |

FOREIGN PATENT DOCUMENTS 3620957  1/1987  Germany .

*Primary Examiner*—Max Noori
*Attorney, Agent, or Firm*—Walter Ottesen

[57] ABSTRACT

The invention is directed to an arrangement for making contactless distance measurements within an air spring of a motor vehicle. With the invention, it is unnecessary to modify the longitudinal support of the motor vehicle for the purpose of integrating an ultrasonic distance measuring device. The arrangement includes a transmitter/receiver component (16) which is fixedly mounted to the chassis and is mounted within the air spring (2) laterally next to the support (10) of the vehicle, that is, the transmitter/receiver component is mounted elastically off-center in a tubular stub (14) arranged as part of the cover plate (4). A reflector component (24) is fixedly mounted on the axle and assigned to the transmitter/receiver component (16). The reflector component (24) is mounted on the roll-off piston (8) and includes a lens-shaped convex surface (26) having a surface normal (28) directed toward the transmitter/receiver component (16).

13 Claims, 3 Drawing Sheets

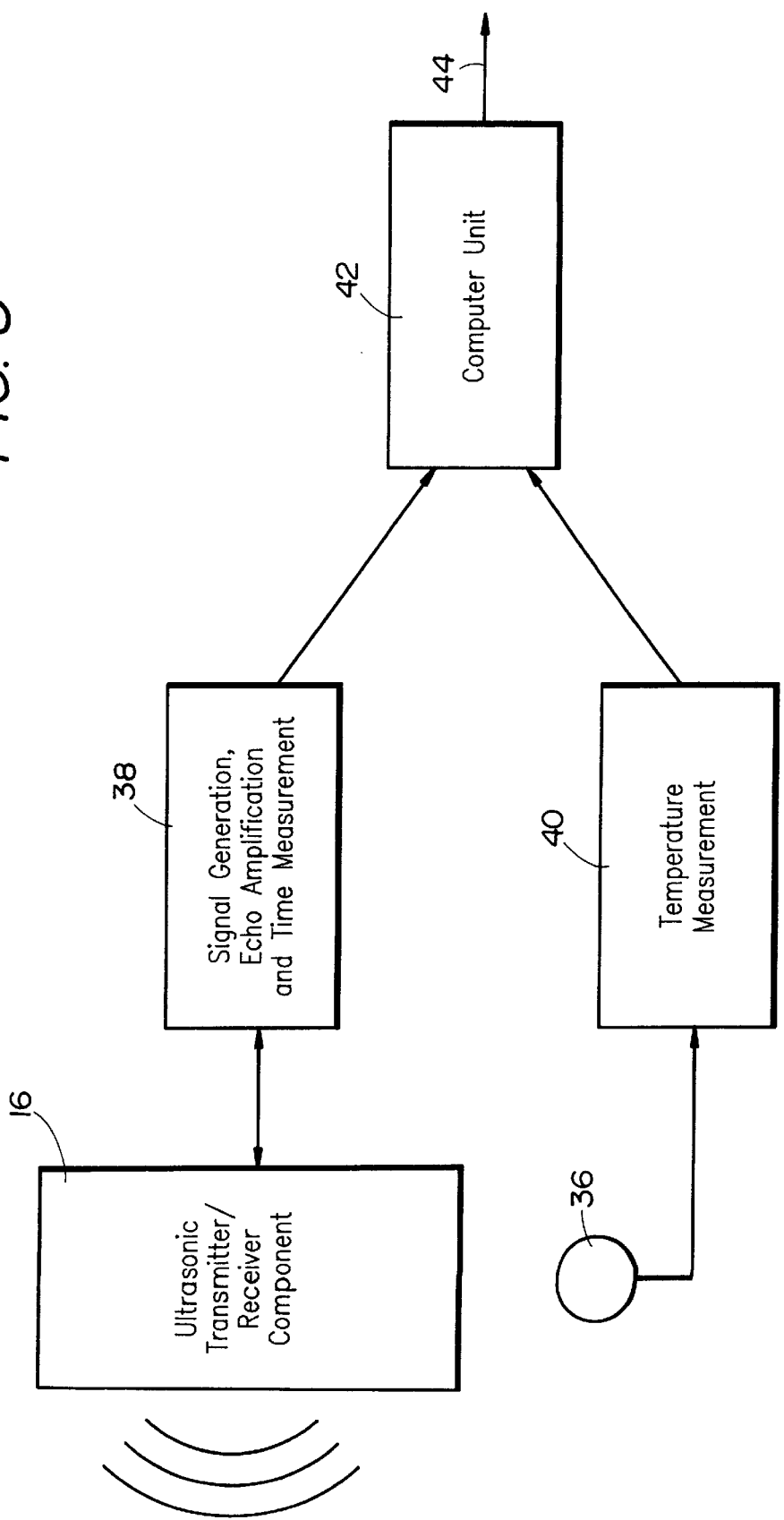

1

ARRANGEMENT FOR MAKING CONTACTLESS DISTANCE MEASUREMENTS

FIELD OF THE INVENTION

The invention relates to an arrangement for making contactless distance measurements within an air spring of a motor vehicle in accordance with the pulse/echo method.

BACKGROUND OF THE INVENTION

An arrangement including a transmitter/receiver component fixedly mounted to a chassis and a reflector component fixedly mounted on an axle is disclosed, for example, in German patent publication 3,620,957.

Within the bellows of an air spring, distances of approximately 0 to 600 mm in length are to be measured at temperatures between −400° C. and +120° C. to determine the distance between the chassis of a vehicle and the axle. An advantage of utilizing ultrasound within an air spring is that no turbulence is imparted to the sound waves because of the wind generated during movement of the vehicle.

German patent publication 3,620,957 discloses an air spring system which includes a measuring device for determining the spacing between a first part of the spring fixedly mounted to the chassis and a second part of the spring fixedly mounted to the axle. The measuring device comprises an ultrasonic transducer for transmitting a series of pulses in the axial direction of the spring. Furthermore, means are provided to receive these axially directed pulses after the pulses have traveled at least once through the distance of the interior of the spring. Preferably, the second end element is a reflector and the receiver is disposed in the region of the transmitter.

The air springs, which are equipped with such a transmitter/receiver unit, were found to be unsuitable in practice. It turned out to be a disadvantage that the transmitter/receiver unit is disposed centrally on the longitudinal axis on the upper part of the air spring. In order to provide the necessary structural space for accommodating this part and its feed line, it is necessary to bore the longitudinal support of the vehicle disposed centrally above the air spring or to provide a corresponding cutout therein. This requires additional manufacturing steps and mounting is difficult. If one would arrange the transmitter/receiver unit and reflector off center, then there would be no reproducible path distance to the reflector because the deflection or movement of an air spring does not take place exclusively in the axial direction.

Also, for an off-center arrangement, the transmitted beam would not be reflected back again to its starting point because air springs move (as a consequence of the elastic axial attachment) during spring action along a spatial curve which cannot be determined beforehand with precision, that is, angles and lateral displacements are not clearly known. The wobbling movements would operate on the reflections.

If one would transmit to an off-axis surface utilized as a reflector, then a non-reproducible change of the geometric relationships would occur because of angle changes between the part fixed to the chassis and the part of the air spring fixed to the axle. This would be the case especially for a one-sided loading of the vehicle and during travel of the vehicle in a curve. Providing a center axial distance between the part fixed to the chassis and the part fixed to the axle would in no event be possible. If one would attempt to overcome this unsuitable condition by installing a pair of transmitter/receiver-reflector units, then the complexity of the apparatus would double.

SUMMARY OF THE INVENTION

It is an object of the invention to overcome the above-mentioned unsuitable conditions and to provide an air spring equipped with a distance measuring system which can be universally utilized without requiring a special construction of the support of the motor vehicle.

The arrangement of the invention is for contactlessly measuring the distance between first and second parts within an air spring of a motor vehicle. The first part is fixedly connected to the chassis of the motor vehicle and the second part is fixedly connected to the axle of a wheel of the motor vehicle and the first and second parts are movable relative to each other causing the distance therebetween to vary. The air spring defines an axis of symmetry and the arrangement includes: a transmitter/receiver unit mounted on one of the parts off-center relative to the axis; and, a reflector component mounted on the other one of the parts so as to be on the axis and the reflector component defining a convexly formed reflecting surface aligned in a direction toward the transmitter/receiver unit.

According to a feature of the invention, the transmitter/receiver component is not mounted centrally; rather, this component is mounted outside of the longitudinal axis of the air spring. The ultrasound beam transmitted by the transmitter component is not aligned parallel to the longitudinal axis of the air spring but inclined with respect thereto. The ultrasound beam is transmitted in a direction toward the surface of a reflector disposed on a part of the spring fixed to the axle of the vehicle. The surface of this reflector is aligned toward the transmitter/receiver unit and is configured so as to be convex. This surface is arranged coaxially, that is, the body defining this surface is mounted on the longitudinal axis of the air spring.

When utilizing a one-piece ultrasonic component (wherein the transmitter and receiver are the same component or are arranged in close proximity to each other), the result is achieved with the aid of the arrangement of the invention that there is always adequate sound intensity returned from the reflector to the receiver.

Neither a special vehicle support construction is required nor is an intervention in the existing vehicle support required because of the off-center arrangement of the ultrasonic component.

The reflector component, which corresponds to the ultrasonic component, can be a part of the conventional rubber bumper; that is, no additional components are required for the reflector and there is no reduction in the path of the movement of the air spring because of the reflector component. In lieu of rubber, the bumper can be made of elastomer or plastic.

Because of the configuration of the reflector, there is always sufficient ultrasound returned to the receiver. The work signal is so large that it can be clearly read out from diverse disturbance rays (multiple reflections, et cetera). Wobbling has no influence on the measured center spring height because of the centered arrangement of the reflector.

For the case where the rubber bumper is not mounted on the roll-off piston but on the cover plate, then a component mounted on the roll-off piston can be utilized as a reflector. This reflector is then formed in accordance with the invention.

The arrangement of the ultrasonic component in a pipe stub affords the advantage that no space of the spring deflection path is lost. The ultrasonic component is accessible externally when mounted in the pipe stub. The elastic mounting of the ultrasonic component prevents propagation of structure-borne sound in the connecting plate of the air spring and ensures a reliable tightness with respect to the ambient. A thermosensor mounted in the region of the ultrasonic component facilitates the calculated compensation of the variation of the speed of sound which results because of fluctuations in the temperature.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
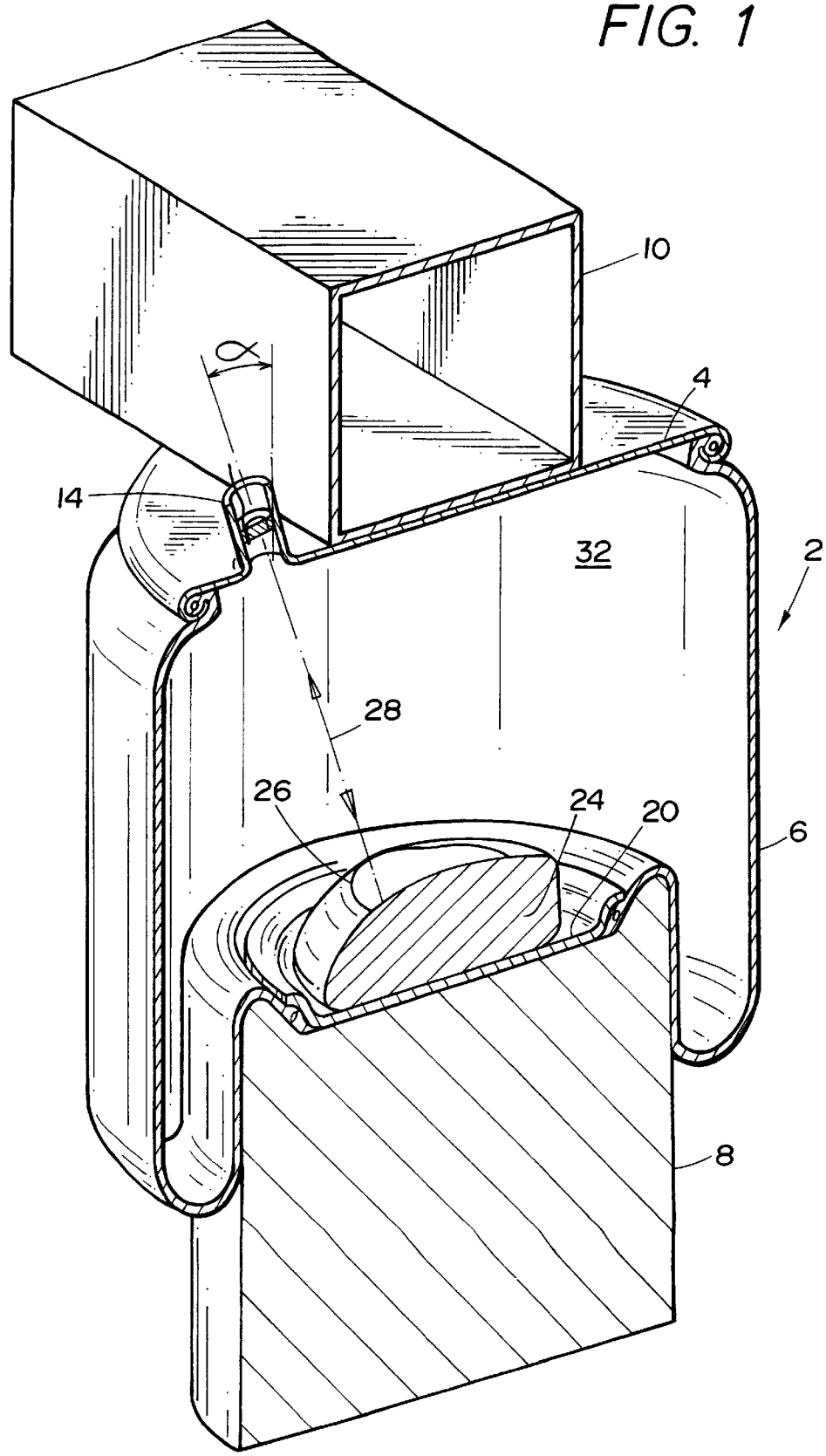
FIG. 1 shows a perspective view of an air spring provided with the ultrasonic arrangement according to the invention for making contactless distance measurements within the air spring.
Figure 2:
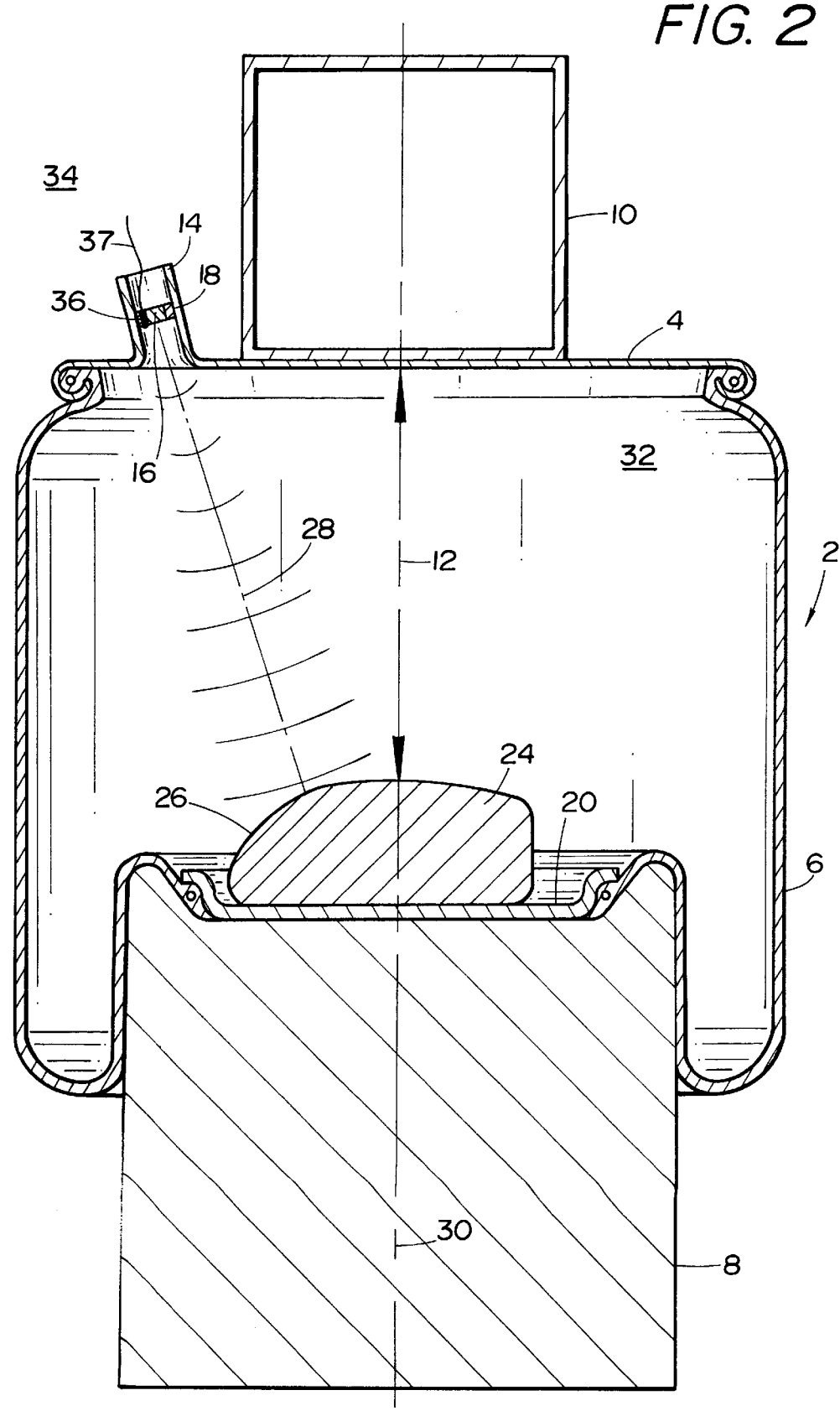
FIG. 2 is a section view of the air spring shown in FIG. 1 equipped with the arrangement according to the invention for making contactless distance measurements within the air spring; and, FIG. 3 is a block circuit diagram incorporating the transmitter/receiver component mounted in the air spring.

Referring to FIGS. 1 and 2, an air spring 2 comprises substantially a cover plate 4, a flexible member 6 and a roll-off piston 8. The cover plate 4 is fixedly mounted to the longitudinal support 10 of the vehicle. The roll-off piston 8 is attached at the wheel end. For a spring deflection, the flexible member 6 rolls on the roll-off piston 8 whereby the clear distance 12 between the cover plate 4 and the roll-off piston 8 correspondingly changes. It is this distance 12 which is to be measured.

For the purpose of measuring distance 12, and according to the invention, a tube stub 14 is provided in the cover plate 4 laterally of the support 10 of the vehicle. An ultrasonic component 16 configured as a transmitter and receiver is mounted in the tube stub 14. The ultrasonic component 16 is mounted elastically by means of an annular support 18. The support 18 is mounted so that air tightness is provided between the pressure chamber (the interior space of the air spring) 32 and the ambient 34. The annular support 18 made of elastic material also insulates the ultrasonic component 16 from structure borne noise.

A temperature sensor 36 senses the temperature in the air spring and is mounted next to the ultrasonic transducer 16 in the annular support. Reference numeral 37 identifies a lead of the temperature sensor 36.

The tube stub 14 is so configured that the free space 12 within the air spring 2 is not restricted. The tube stub 14 is so positioned that in the expanded state of the air spring, the tube stub is directed toward the center of the clamping plate 20 on which usually a rubber bumper is mounted. There, a reflector component 24 is provided which is configured in accordance with the invention. This component can be part of the conventional rubber bumper.

The surface 26 of the reflector component 24 is asymmetrically curved. The surface preferably has a convex configuration. The lateral curvature 26 of the reflecting surface is dependent upon the lateral displacement of the air spring. The axis (surface normal) 28 of the reflector component 24 is inclined relative to the longitudinal axis 30 of the air spring. This inclination of axis 28 is such that it is in the direction toward the tubular stub provided with the ultrasonic component 16, that is, the direction of the reflector component 24 is directed toward the transmitter/receiver component 16. As shown in FIG. 2, the tubular stub 14 is at an angle relative to the axis of symmetry 30 of the air spring so that the axis 28 also defines the longitudinal axis of the tubular stub.

FIG. 3 shows the block circuit diagram incorporating the ultrasonic transmitter/receiver component 16 connected to an electronic circuit 38 for performing the functions of signal generation, echo amplification and time measurement. The running time of the ultrasonic pulses transmitted by the transmitter of component 16 is measured in electronic circuit 38. On the other hand, the temperature is measured with the aid of temperature sensor 36 and temperature measurement circuit 40. The output variable of running time from electronic circuit 38 and the output variable of temperature from circuit 40 are both supplied to computer unit 42 wherein the temperature-corrected distance 12 is computed. This value is then transmitted via an interface 44 to an air spring control circuit (not shown).

It is understood that the foregoing description is that of the preferred embodiments of the invention and that various changes and modifications may be made thereto without departing from the spirit and scope of the invention as defined in the appended claims.

What is claimed is:

1. An air spring for a motor vehicle having a chassis and wheels having respective axles, the air spring defining an axis of symmetry and comprising:

a first part fixedly connected to said chassis;

a second part fixedly connected to one of said axles;

a flexible sleeve member connected between said first and second parts so as to roll on said second part as the vehicle moves over a roadway with said first and second parts being movable relative to each other causing the distance therebetween to vary and with said second part wobbling so as to move away from said axis of symmetry along a spatial curve because of at least one of said roadway and a load carried by said motor vehicle;

a transmitter/receiver unit mounted on one of said parts off-center relative to said axis of symmetry and said transmitter/receiver unit defining a longitudinal axis inclined at an angle to said axis of symmetry and said transmitter/receiver unit being mounted at said angle so as to transmit energy signals along said longitudinal axis; and, a reflector component mounted on the other one of said parts and said reflector component defining a convexly formed reflecting surface aligned in a direction transverse to said longitudinal axis facing toward said transmitter/receiver unit so as to permit said convexly formed reflecting surface to reflect said energy signals back to said transmitter/receiver unit along said longitudinal axis irrespective of said wobbling of said second part relative to said axis of symmetry.

2. The air spring of claim 1, said one part being said first part and said other part being said second part; and, said reflector component being a bumper mounted on said second part and said bumper being formed to define said convexly formed reflecting surface.

3. The air spring of claim 2, said bumper being made of one of the following materials: rubber, elastomer or plastic.

4. The air spring of claim 1, said second part being a roll-off piston of said air spring; said reflector component being a clamping plate mounted on said roll-off piston; and, said clamping plate being formed to define said convexly formed reflecting surface.

5. The air spring of claim 2, said transmitter/receiver unit including a sound transducer which converts electrical signals into sound waves directed toward said convexly formed reflecting surface along said longitudinal axis; said first part being a cover plate of said air spring, said cover plate having a tube stub formed therein; and, said sound transducer being mounted in said tube stub.

6. The air spring of claim 5, said flexible member delimiting a pressure chamber between said first and second parts, the air spring further comprising an elastic support disposed in said tube stub for plastically holding said sound transducer in said tube stub and for providing an air tight seal between said pressure chamber and the ambient.

7. The air spring of claim 6, said transmitter/receiver unit also including a sound receiver for receiving said sound waves reflected from said convexly formed reflecting surface and said arrangement further comprising:

an electronic circuit connected to said transmitter/receiver unit for measuring the running time of said sound waves and for generating a signal indicative of said running time; and, a computer unit for receiving said signal and for calculating said distance between said first and second parts within said air spring.

8. The air spring of claim 7, further comprising:

a temperature sensor mounted in said air spring; and, an additional electronic circuit connected to said temperature sensor for producing an additional signal indicative of the temperature in said air spring; and, said computer unit being connected to said additional electronic circuit for receiving said additional signal for calculating said distance corrected for said temperature.

9. The air spring of claim 8, said temperature sensor being mounted in said plastic support disposed in said tube stub.

10. The air spring of claim 9, said transmitter/receiver unit including a sound transducer which converts electrical signals into sound waves directed toward said convexly formed reflecting surface along said longitudinal axis; said first part being a cover plate of said air spring, said cover plate having a tube stub formed therein; said tube stub defining a longitudinal tube axis and being inclined at said angle with respect to said axis of symmetry so as to cause said tube axis to be coincident with said longitudinal axis; and, said sound transducer being mounted in said tube stub.

11. The air spring of claim 1, said reflector component being configured so as to cause said convexly formed reflecting surface to be asymmetrically curved.

12. The air spring of claim 11, said convexly formed reflecting surface being nonsymmetrical with respect to said axis of symmetry.

13. The air spring of claim 1, said convexly formed reflecting surface being nonsymmetrical with respect to said axis of symmetry.

* * * * *